June 5, 1923.
L. W. BUGBEE
TRIAL FRAME
Filed Dec. 18, 1917
1,457,494
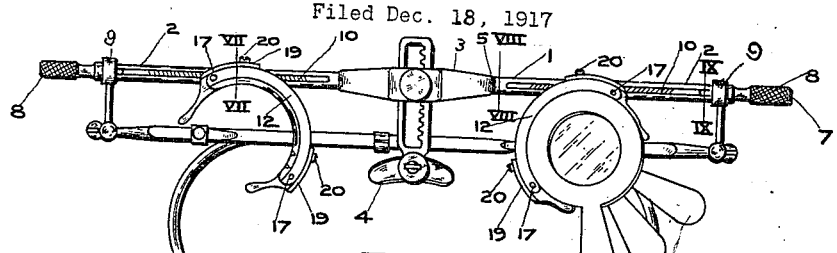
FIG. I
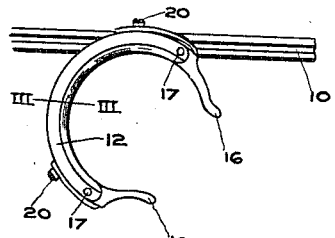
FIG. II
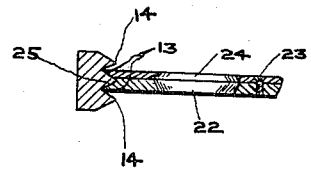
FIG. III
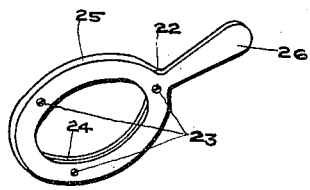
FIG. IV
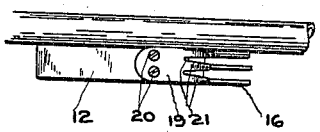
FIG. V
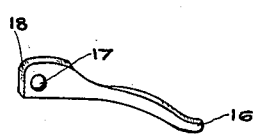
FIG. VI
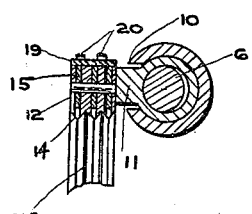
FIG. VII
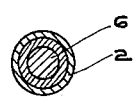
FIG. VIII
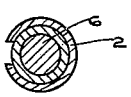
FIG. IX
FIG. X
INVENTOR
LUCIAN W. BUGBEE
BY
H. H. Styll & H. S. Parsons
ATTORNEYS.

Patented June 5, 1923.

1,457,494

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL FRAME.

Application filed December 18, 1917. Serial No. 207,709.

*To all whom it may concern:*

Be it known that I, LUCIAN W. BUGBEE, a citizen of the United States, residing at Southbridge, in the county of Worcester and State of Massachusetts, have invented certain new and useful Improvements in Trial Frames, of which the following is a specification.

This invention relates to new and useful improvements in trial frames and more particularly to a trial frame adapted for use in testing the eyes of the patient when fitting lenses thereto, and the main object of the invention is the provision of a trial frame wherein one or a plurality of lenses may be supported before the eye of the patient.

Another object of the present invention is the provision of a trial frame wherein a plurality of lens supports are removably supported before the eye of the patient whereby one or more of the lenses may be removed from the support or placed in position in accordance with the test for the fitting of corrected lenses to the patient's eyes.

A further object of the invention is the provision of a trial frame wherein a plurality of detachable lens supports are supported in front of the eyes of the patient and adapted for lateral adjustment toward or away from the nose rest so that the eyes of the patient will not only be tested for corrected lenses but the pupillary distance may be readily obtained in connection with the lens test.

A still further object of the invention is the provision of laterally adjustable supporting means for trial frames adapted to be disposed in front of the eyes of the patient and adapted to contain lens holders which are rotatably and removably supported therein so that the lenses of various characters may be readily disposed before the eyes of the patient without removing the trial frame from the face.

With the above and other objects in view the invention consists in the novel features of construction and the general arrangement of parts hereinafter more fully set forth, pointed out in the claims and shown in the accompanying drawings, in which—

Figure I is the front elevation of a trial frame constructed in accordance with my invention.

Figure II is the front elevation of one of the adjustable supporting members, the lens frames being removed.

Figure III is a transverse sectional view taken on the line III—III of Figure II illustrating one of the lens frames in position within the support.

Figure IV is a detailed perspective view of one of the lens frames.

Figure V is a top plan view of the supporting member, and

Figure VI is a perspective view of one of the spring actuated retaining fingers.

Figure VII is a transverse sectional view taken on the line VII—VII of Figure I.

Figure VIII is a transverse sectional view taken on the line VIII—VIII of Figure I.

Figure IX is a similar view taken on the line IX—IX of Figure I.

Figure X is a detail top plan view.

Referring now more particularly to the drawings in which the various reference symbols designate several parts of my improved trial frame, the numeral 1 indicates in general the supporting bar which includes the two tubular end extensions 2 connected at the inner ends by the substantially U-shaped offset 3. The offset 3 is adapted to support the adjustable nose piece 4. The tubular end pieces 2 are each provided within their inner ends with suitable bearings 5 supporting the inner ends of the screw members 6, and attached to the outer ends of these screw members are the heads 7, the outer ends of which are provided with a knurled outer surface 8 whereby the same may be readily grasped to facilitate an easy turning movement of the screw. The inner end of the heads 7 is arranged within a suitable bearing 9 whereby to support the screw members centrally within the tubular portions 2.

Attached to the screw members 6 and extending through a longitudinal slot 10 within the tubular members 2 is a transverse plate 11 connected at its outer end with the arcuate supporting frames 12, one of each said frames being supported upon the opposite sides of the nose piece 4 and movable laterally with respect to the nose piece upon adjustment with the screw members 6. These arcuate supporting members include a body portion having its inner face provided with grooves 13 forming the ribs 14, while the ends of the body member 12 are provided with longitudinal slots 15 disposed in alignment with the ribs 14 and adapted to receive the inner ends of the fingers 16.

It will be noted from the accompanying drawings that the inner ends of the fingers 16 are of substantially the same width as the thickness of the body portion of the supporting members 12, and extending through the ends of the member 12 and through the ends of the fingers 16 at their inner ends is a pivoted pin 17 whereby the fingers are mounted for swinging movement within the slots 15. It will be noted, however, that the inner ends of the fingers are beveled as at 18 whereby the swinging movement of the fingers will be limited by having the corners of the inner ends of the fingers, at one side of the bevel, engaging with the shoulders formed at the inner ends of the slots 15. When in operative position, the fingers 16 project inwardly to a certain extent toward the center of the circle outlined by the arcuate member 12 so that a member extended between the ends of the arms 16 upon opposite ends of the member 12 will be yieldably retained in position until forcibly withdrawn from between the ends of the fingers.

In order to yieldably retain the fingers in their operative positions, I have provided a plate 19 the body portion of which is secured to the outer surface of the member 12 by means of the screws 20. It will be understood, however, that this piece may be riveted, soldered, or otherwise secured to the ends of the body member 12 instead of using the screw members indicated in the accompanying drawings. The outer ends of these plates 19 are bifurcated to provide a plurality of spring tongues 21 each of which is adapted to bear against the outer edge of the enlarged inner ends of the fingers 16 whereby to yieldably retain the fingers in their operative positions and, when an object is placed between the fingers, to yieldably retain the subject within the arcuate supporting member 12.

It will be noted that these arcuate supporting members 12 are laterally adjusted toward or away from the nose bridge 4, and removably arranged within the supporting members are the lens frames generally indicated by the numeral 22 and which include a circular body portion consisting of two opposed plates detachably connected together by means of the screw members 23, each of said plates being beveled outwardly, upon one face thereof, the bevels extending in opposite directions as indicated whereby when the two plates are placed together, with their beveled faces opposing each other, it will provide upon the interior of the body 22 a lens-receiving groove 24 while the exterior of the body 22 will be provided with a similar groove 25 whereby the lens frame may be arranged within the arcuate member 12, one of the ribs 14 will engage within the groove to retain the lens frame against lateral movement, while the movable fingers 16 at opposite ends of the member 12 will also engage within the groove beyond the center of the lens frame and yieldably retain the lens frame within the supporting member 12. It will be noted, however, that the lens frame can be quickly and readily removed from the arcuate member between the ends of the fingers 16.

The lens frames 22 are provided with outwardly extending handle members 26, said handle members being inwardly formed with one of the circular plates constituting the body of the frame and are preferably enlarged at their outer ends whereby the strength of the lens, the size, etc., may be marked upon the handle so that in testing the eyes of the patient, it is only necessary to place the lens frames within the supporting members 12, and as the correct lens is discovered, through the test, the number of this lens may be readily obtained from the handle of the lens frame and inscribed upon a pad for future reference when prescribing for the patient's eyes. It will be readily apparent that various kinds of lenses can be readily arranged before the eyes of the patient and the eyes tested very quickly through the medium of having the lens frames removably supported before the eye so that the lenses can be readily exchanged until the desired ones are obtained.

I claim:

1. A trial frame ring comprising a pair of plate members of substantially circular form having central apertures formed therethrough and having the edge defining the aperture and the peripheral edge each bevelled, and means for securing a pair of plates together with their bevelled sides toward each other whereby an inner lens receiving groove and an outer frame receiving groove is provided in the completed trial lens cell.

2. A device of the class described including laterally adjustable supporting members, ribs formed therein, the ends of said supporting members having slots, pivoted fingers disposed within the slots and arranged in alignment with the ribs, and spring tongues carried by the supporting members for engagement with the fingers for the purpose set forth.

3. A device of the character described including a pair of relatively adjustable supporting members of arcuate form each provided with a projecting guide rib, resiliently actuated fingers forming continuations of said rib, and lens cells having peripheral grooves to receive the rib and fingers whereby the cells are positioned and rotatably supported by said rib and fingers.

4. A device of the class described including laterally adjustable supporting members substantially arcuate in form, ribs formed within said supporting members, spring actuated pivoted fingers carried by the ends of said supporting members and arranged in alignment with the ribs, and lens frames removably disposed within the supporting members and adapted to be engaged by the fingers for yieldably retaining the frames within the supporting members.

5. An eye testing device or the like, comprising a lens support of arcuate form having a plurality of spaced guide ribs extending inwardly therefrom, said ribs terminating at one end in resilient fingers forming continuations of the rib.

6. A precision eye testing device including an arcuate support having a plurality of spaced arcuate guide ribs, lens cells having exterior grooves to receive said ribs, means engaged in the grooves for rotatably holding the cells in engagement with the ribs, and handle portions on the cells for manipulating the latter.

7. In a trial frame, the combination with a support, of a plurality of independent lens frames mounted therein with their faces in engagement one with the other, said frames having central lens receiving apertures formed therein, lenses within the apertures, each lens having its individual frame member, and means on the support engaging the individual frame members within the space bounded by the faces thereof for removably securing the frame members and contained lens in position on the support.

8. A precision trial frame including a support having a plurality of guide portions, apertured frames having portions for interfitting engagement with the guide portions, a lens carried by each of the frames, said frames having an appreciable extent of flat side surface engagement one with the other when in interfitting relation with the guide portions, whereby said surface engagement of the frames accurately relatively positions the lenses carried thereby.

9. A trial frame cell comprising a relatively small diameter lens, and a relatively wide supporting frame therefor having flat lateral sides, said frame having a peripheral groove to receive a supporting member.

10. In a trial frame, a lens supporting member having a plurality of inwardly projecting ribs providing intermediate grooves and removable lens supports for use in connection therewith having peripheral grooves formed therein to receive the ribs and projecting portions bounding the grooves and extending into the grooves of the support.

11. An eye testing set including a holder and a plurality of lens cells for use in connection with the holder, said cells each having flat faces adapted for engagement one with the other, and the holder having individual cell engaging portions arranged to hold the cells in engagement one with the other when in operative position.

12. An eye testing set including a support and a plurality of interchangeable lens cells for use in connection therewith, said lens cells including plate portions having flat faces for engagement one with the other, and outwardly bevelled whereby the engaging faces together form a peripheral guide rib, and means on the support for receiving said combined rib.

13. In a trial frame, a lens cell holder comprising an arcuate member having a plurality of grooves formed therein, providing intermediate projecting guide ribs, said parts being so related that the rib will interlock with a single lens cell and the groove will receive contiguous portions of a pair of lens cells to hold the cells in engagement one with the other.

In testimony whereof I have affixed my signature, in presence of two witnesses.

LUCIAN W. BUGBEE.

Witnesses:
HARRY H. STYLL,
H. K. PARSONS.